(12) United States Patent
Agrawal et al.

(10) Patent No.: US 12,182,551 B2
(45) Date of Patent: Dec. 31, 2024

(54) USING A SEMANTIC TREE OF A COMPILER TO EXECUTE A SEMANTIC CODE QUERY AGAINST SOURCE CODE

(71) Applicant: Microsoft Technology Licensing, LLC, Redmond, WA (US)

(72) Inventors: Vatsalya Agrawal, Sammamish, WA (US); Manish Vasani, Rajkot (IN); Amaury Jacques Patrice Levé, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 17/851,434

(22) Filed: Jun. 28, 2022

(65) Prior Publication Data

US 2023/0418574 A1 Dec. 28, 2023

(51) Int. Cl.
*G06F 8/41* (2018.01)
*G06F 8/38* (2018.01)
*G06F 8/73* (2018.01)

(52) U.S. Cl.
CPC .............. *G06F 8/427* (2013.01); *G06F 8/38* (2013.01); *G06F 8/436* (2013.01); *G06F 8/73* (2013.01)

(58) Field of Classification Search
CPC ...................................................... G06F 8/436
USPC ........................................................ 717/143
See application file for complete search history.

(56) References Cited

U.S. PATENT DOCUMENTS

| | | | |
|---|---|---|---|
| 5,671,416 A | 9/1997 | Elson | |
| 8,881,122 B1 * | 11/2014 | Klimek | G06F 8/427 717/140 |
| 9,239,710 B2 * | 1/2016 | Araya | G06F 8/42 |
| 9,489,418 B2 * | 11/2016 | Brodsky | G06F 16/2423 |
| 9,696,974 B2 * | 7/2017 | Pamer | G06F 8/437 |
| 9,875,087 B2 * | 1/2018 | Scholz | G06F 8/427 |
| 10,540,350 B2 * | 1/2020 | Fontenot | G06F 8/427 |
| 10,614,126 B2 * | 4/2020 | Van Rest | G06F 16/835 |
| 10,809,984 B2 * | 10/2020 | Mizrahi | G06F 40/242 |
| 11,461,324 B2 * | 10/2022 | Fender | G06F 16/24535 |

(Continued)

FOREIGN PATENT DOCUMENTS

CN 116610697 A * 8/2023

OTHER PUBLICATIONS

CN-116610697-A—English Text Translation.*

(Continued)

*Primary Examiner* — Francisco J Aponte
(74) *Attorney, Agent, or Firm* — Wade IP Law PLLC

(57) ABSTRACT

Techniques are described herein that are capable of using a semantic tree of a compiler to execute a semantic code query against source code. An object model representing the source code is generated. The object model includes the semantic tree, which is based at least in part on a grammar defined at least in part by the object model and an application programming interface (API) exposed by the compiler. The semantic code query, which is written in a code query language associated with the compiler, is received as an input to the compiler. The semantic code query includes search criteria. A portion of the source code that satisfies the search criteria is determined using the API. A result of the semantic code query is provided. The result identifies the portion of the source code that satisfies the search criteria.

23 Claims, 10 Drawing Sheets

(56) References Cited

U.S. PATENT DOCUMENTS

| | | | | |
|---|---|---|---|---|
| 11,816,456 | B2* | 11/2023 | Kroth | G06F 8/44 |
| 2014/0096112 | A1* | 4/2014 | DeLine | G06F 11/3608 |
| | | | | 717/125 |
| 2017/0329974 | A1* | 11/2017 | Li | G06F 21/562 |
| 2018/0150459 | A1* | 5/2018 | Farid | G06F 16/22 |
| 2019/0026087 | A1* | 1/2019 | Hou | G06F 8/42 |
| 2019/0324731 | A1* | 10/2019 | Zhou | G06F 8/427 |
| 2020/0117446 | A1* | 4/2020 | Smith | G06F 8/75 |
| 2020/0210157 | A1* | 7/2020 | Munaganuru | G06F 16/2428 |
| 2021/0279045 | A1* | 9/2021 | Ko | G06F 8/425 |
| 2022/0121554 | A1* | 4/2022 | Das | G06F 11/3624 |
| 2022/0156062 | A1 | 5/2022 | Kroth et al. | |
| 2022/0236964 | A1* | 7/2022 | Bahrami | G06F 8/74 |
| 2022/0374428 | A1* | 11/2022 | Nassar | G06F 16/284 |
| 2022/0374595 | A1* | 11/2022 | Gotmare | G06F 40/40 |
| 2023/0025341 | A1* | 1/2023 | Bettin | G06F 16/245 |
| 2023/0251837 | A1* | 8/2023 | Drepper | G06F 8/437 |
| | | | | 717/141 |
| 2023/0418574 | A1* | 12/2023 | Agrawal | G06F 8/33 |

OTHER PUBLICATIONS

Epure, Claudiu, and Adrian Iftene. "Semantic analysis of source code in object oriented programming. A case study for C." Romanian Journal of Human-Computer Interaction 9.2 (2016).*

Selvaraj, Ganesh Kumar. Improving Program Analysis using Efficient Semantic and Deductive Techniques—The University of Auckland, 2022.*

Johnson, et al., "CRAQL: A Composable Language for Querying Source Code", In repository of Arxiv Code: 1901.09409 [cs.PL], Jan. 27, 2019, 10 Pages.

"International Search Report and Written Opinion Issued in PCT Application No. PCT/US23/022618", Mailed Date: Sep. 12, 2023, 15 Pages.

Saadatmand, Mehrdad, "IntegrationDistiller: Automating Integration Analysis and Testing of Object-Oriented Applications", In Proceedings of IEEE International Conference on Industrial Technology (ICIT), Feb. 13, 2019, pp. 1385-1392.

"Discover amazing details you never thought about your C\C++ projects", Retrieved from: https://web.archive.org/web/20220415155211/https://www.cppdepend.com/, Apr. 15, 2022, 5 Pages.

"The "Swiss Army Knife" for .NET Developers, Architects and Teams", Retrieved from: https://web.archive.org/web/20220427083358/https://www.ndepend.com/, Apr. 25, 2022, 7 Pages.

Harwell, et al., "roslyn", Retrieved from: https://github.com/dotnet/roslyn, Dec. 15, 2021, 4 Pages.

Kristensen, et al., "CodeQL", Retrieved from: https://web.archive.org/web/20220427131234/https://github.com/github/codeql/, Apr. 27, 2022, 3 Pages.

Wagner, et al., "The .NET Compiler Platform SDK", Retrieved from: https://docs.microsoft.com/en-us/dotnet/csharp/roslyn-sdk/, Sep. 15, 2021, 6 Pages.

Wagner, et al., "Work with a workspace", Retrieved from: https://docs.microsoft.com/en-us/dotnet/csharp/roslyn-sdk/work-with-workspace, Sep. 15, 2021, 4 Pages.

"Language Integrated Query (LINQ) (C#)", Retrieved from: https://docs.microsoft.com/en-us/dotnet/csharp/programming-guide/concepts/linq/, Jun. 10, 2022, 5 Pages.

* cited by examiner

```
// Find all public methods with "MyAttribute" attribute from method in Solution.Methods
where method.IsPublic == true
where  method.GetAttributes.Any(attribute => attribute.Name == "MyAttribute")
select method
```

FIG. 5

```
// Find method calls to "M" inside type "T" or its sub-types from methodCall in Project.MethodCalls
where methodCall.TargetMethod.Name == "M"
where methodCall.ContainingType.GetBaseTypesOrThis().Any(type => type.Name == "T")
select method
```

FIG. 6

```
// Find all public methods that return type "T"

from method in Solution.Methods
where method.IsPublic == true
where method.ReturnType.Name == "T"
select method
```

FIG. 7

```
Find all non-static fields that have a specific attribute "OnlyForStaticsAttribute" that
must only be applied to static fields from field in Solution.Fields
where field.IsStatic == false
where field.GetAttributes.Any(attribute => attribute.Name == "OnlyForStaticsAttribute")
select field
```

FIG. 8

```
// Remove all attributes named "NotForStaticsAttribute" on static fields, as the attribute
is only designed to be applied to non-static fields.

from field in Solution.Fields
where field.IsStatic == true
from attribute in field.GetAttributes()
where attribute.Name == "NotForStaticsAttribute"
remove attribute
```

FIG. 9

```
// Detect complex methods based on lines count metric from method in Solution.Methods
where method.LinesCount > 20
select (method.Name, method.LinesCount)
```

FIG. 10

```
// Find all types from the Domain namespace/
layer that reference types from the Data namespace/layer.

from type in  Solution.Types
where type.Namespace.Contains("Domain") && type.References.Contains("Data")
select type
```

FIG. 11

```
// Find all nested types from type in  Solution.Types
where type.ContainingType != null
select type
```

FIG. 12

```
// Find all TODO: DD/MM/YYYY comments where date is older than 3 months from syntaxNode in Project.SyntaxNodes
where syntaxNode.Kind == SyntaxKind.SingleLineCommentTrivia
   && Regex.Match(syntaxNode.Identifier.ToString(), "TODO: ^[0-9]{1,2}\/[0-9]{1,2}\/[0-9]{4}$") is { } match
   && match.Success
   && DateTime.TryParse(match.Value, out var date)
   && DateTime.Now.Subtract(date).TotalDays > 90
select syntaxNode
```

FIG. 13

```
// First get all the methods in the project, then get all the "variable" symbols in each method,
// and finally filter down to only those variables where the method's code block has no references to that variable From method in Project.Methods
from variable in method.Variables
where method.CodeBlock.SymbolReferences.Count(reference => reference.Variable == variable) == 0
select variable
```

FIG. 14

```
// Asynchonous methods normally contain long running operations, and it is recommended for such methods to be cancellable during the operation. CancellationToken parameter allows such methods to be cancellable.

// Find all async methods in the project, such that the method signature has no parameter of type CancellationToken from method in Project.Methods
where method.IsAsync == true
where !method.Parameters.Any(parameter => parameter.Type.FullName == "System.Threading.CancellationToken"
select method
```

FIG. 15

```
// A lock statement is used in multi-threaded code to ensure only one thread can execute
a certain block of code at a time. If a second thread reaches the same code block while
the first thread is still executing it, the second thread waits for the first thread to
complete executing the block, before it executes it.
// As such a code block is very sensitive, it is recommended that code inside a lock
statement does not call public methods that transfer control outside the current type, as
that outside code might again call into the same method and lead to a cycle of method
calls that leads the application code to hang or crash.

// Find all lock statements which contains calls to public methods within it.

from statement in Project.ExecutableStatements
where statement.Kind == SyntaxKind.Lock
from expression in statement.DescendantExpressions()
where expression.Kind == SyntaxKind.MethodCall
where Project.GetSymbol(expression) is MethodSymbol method
        && method.IsPublic == true
select statement
```

FIG. 16

```
// Rename local variables in the solution to fix casing such that the name starts with a
lowercase character.

from method in Solution.Methods
from variable in method.Variables
where variable.Name[0].IsUpperCase() == true
rename variable (variable.Name[0].ToLowerCase() + variable.Name.SubString(1))
```

FIG. 17

USING A SEMANTIC TREE OF A COMPILER TO EXECUTE A SEMANTIC CODE QUERY AGAINST SOURCE CODE

BACKGROUND

A compiler is logic (e.g., a computer program) that translates (a.k.a. compiles) computer code written in a first programming language into a second programming language. For instance, the compiler may translate source code to machine code. Examples of traditional functionality that a compiler uses to translate computer code include but are not limited to preprocessing, lexical analysis, parsing, semantic analysis, code optimization, and code generation. Preprocessing involves processing input data to produce output data that is used as input by the compiler. Lexical analysis involves converting a sequence of characters into a sequence of lexical tokens. A lexical token is a string of one or more characters that has an assigned meaning. Parsing involves analyzing a string of symbols that conform to rules of a formal grammar. Semantic analysis involves gathering semantic information from source code.

Many modern compilers include additional functionality beyond the traditional functionality mentioned above. For instance, such compilers may be capable of executing a database-based query or a code analysis-based query on source code. With regard to a database-based query, the compiler indexes a particular commit of the source code into a database with a pre-defined schema, and the database-based query is executed on the database. Accordingly, execution of a database-based query typically requires a separate indexing pass, which makes the database-based query less suitable for inner development loop scenarios than for offline search and analysis scenarios. With regard to a code analysis-based query, a user typically utilizes intelligent code completion functionality of a query editor within a standalone code analysis tool, which has a customized grammar, to write and execute the code analysis-based query. By relying on a standalone code analysis tool having a customized grammar, the code analysis-based query is less suitable for inner development loop scenarios than for standalone code analysis and quality improvement scenarios.

SUMMARY

Various approaches are described herein for, among other things, using a semantic tree of a compiler to execute a semantic code query against source code. A semantic code query is a code query that requests semantic information about code. The semantic information indicates a meaning of at least a portion of the code. A code query is a query that is configured to be executed against code (e.g., against an object model that represents the code) to determine information about code. The code query includes search criteria that define the information that is to be obtained from execution of the code query. The object model may represent an in-memory representation of a project (including documents thereof) that is generated by a library of the compiler during compilation. The object model may be produced by an executable of the compiler during a build of the source code or produced by the compiler running in the background of an integrated development environment (IDE) typing session. A project is a collection of documents that compile into a single binary. A document is a single text file that includes source code.

A semantic code query may be categorized as a semantic search query, a code analysis query (a.k.a. semantic code analysis query), and/or a code modification query (a.k.a. code transformation query). A semantic search query is a semantic code query that causes code to be filtered based on one or more semantic search criteria so that a portion of the code, which satisfies the one or more semantic search criteria, is returned. A semantic search criterion is a search criterion that indicates a requisite meaning (e.g., rather than merely a requisite syntax). A code analysis query is a semantic code query that causes code to be analyzed based on one or more semantic search criteria so that a portion of the code, which satisfies the one or more semantic search criteria, is flagged. A code modification query is a semantic code query that causes at least a portion of code to be modified or deleted. It will be recognized that a semantic code query may be categorized among any one or more of the aforementioned categories. For instance, a semantic search query may also constitute a code analysis query and/or a code modification query.

A compiler may be configured to generate an object model, which represents source code. The object model includes a semantic tree, which indicates a semantic meaning of each of one or more portions of the source code. For instance, the semantic tree may be generated from a syntax tree by adding semantic information about the portion(s) of the source code to the syntax tree. A syntax tree is a tree that represents a syntactic structure of source code. For example, a syntax tree may include all syntax nodes and tokens corresponding to each document in a project. A syntax node is a group of continuous syntax tokens in a document that have a semantic meaning, such as a method declaration, a type declaration, a line of executable code, and so on. A syntax token is a group of continuous text characters in a document that have a semantic meaning, such as a keyword, identifier, operator, and so on.

In an example approach, an object model that represents source code is generated. For instance, the object model may be generated during a build of the source code or as a compiler that generates the object model runs in the background of an IDE typing session. The object model includes a semantic tree. The semantic tree represents a meaning of strings in the source code based at least in part on a grammar. The grammar is defined at least in part by an application programming interface (API) that is exposed by the compiler and the object model. A semantic code query, which is written in a code query language associated with the compiler, is received as an input to the compiler. For instance, the semantic code query may be received during a build of the source code or as a compiler that generates the object model runs in the background of an IDE typing session. The semantic code query includes search criteria. A portion of the source code that satisfies the search criteria is determined by executing the semantic code query against the semantic tree using the API that is exposed by the compiler. A result of the semantic code query is provided. The result identifies the portion of the source code that satisfies the search criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 5-17 depict example code snippets in accordance with embodiments.

Figure 1:
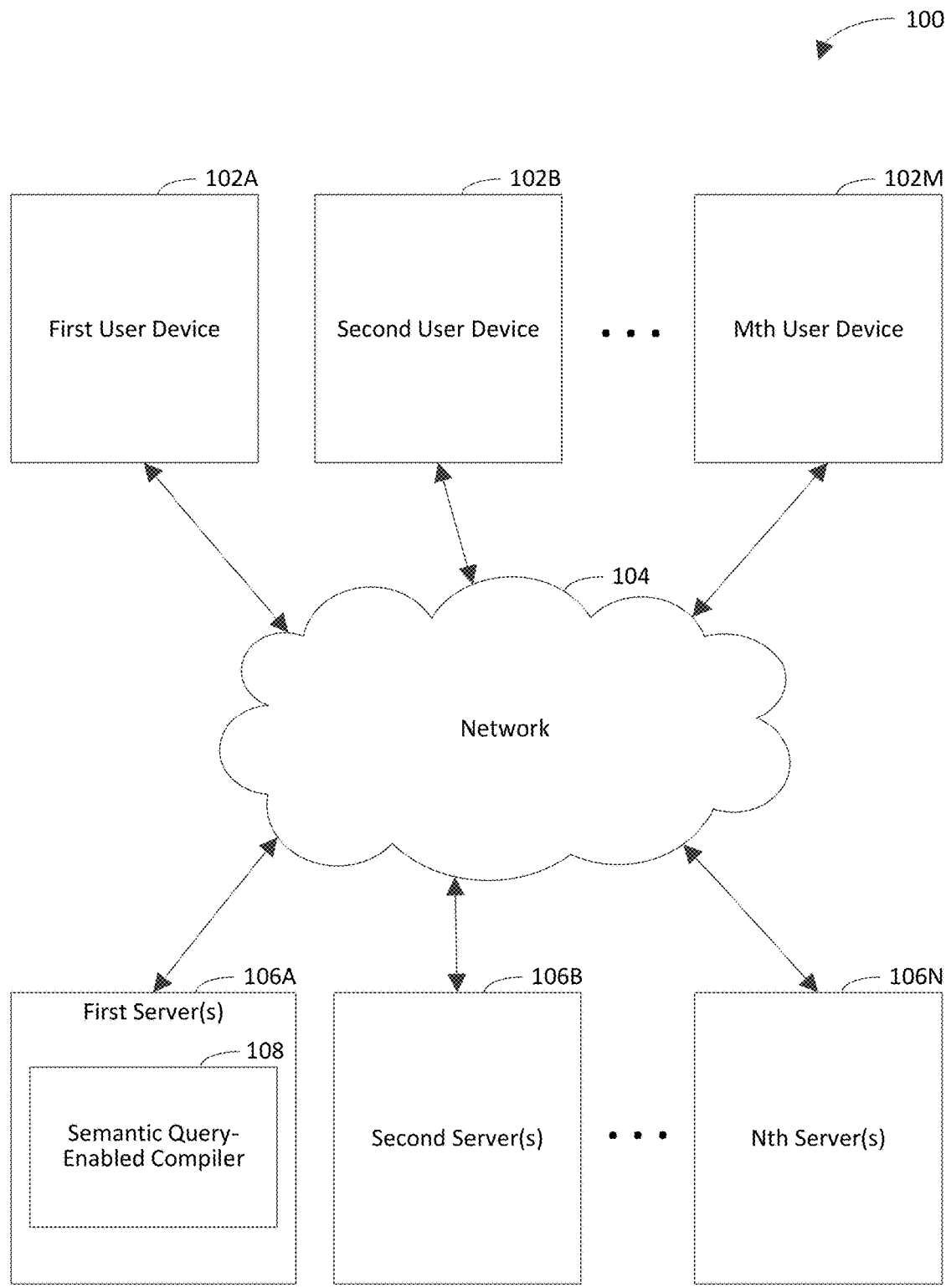
FIG. 1 is a block diagram of an example semantic query-enabled compilation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using a semantic tree of a compiler to execute a semantic code query against source code. A semantic code query is a code query that requests semantic information about code. The semantic information indicates a meaning of at least a portion of the code. A code query is a query that is configured to be executed against code (e.g., against an object model that represents the code) to determine information about code. The code query includes search criteria that define the information that is to be obtained from execution of the code query. The object model may represent an in-memory representation of a project (including documents thereof) that is generated by a library of the compiler during compilation. The object model may be produced by an executable of the compiler during a build of the source code or produced by the compiler running in the background of an integrated development environment (IDE) typing session. A project is a collection of documents that compile into a single binary. A document is a single text file that includes source code.

A semantic code query may be categorized as a semantic search query, a code analysis query (a.k.a. semantic code analysis query), and/or a code modification query (a.k.a. code transformation query). A semantic search query is a semantic code query that causes code to be filtered based on one or more semantic search criteria so that a portion of the code, which satisfies the one or more semantic search criteria, is returned. A semantic search criterion is a search criterion that indicates a requisite meaning (e.g., rather than merely a requisite syntax). A code analysis query is a semantic code query that causes code to be analyzed based on one or more semantic search criteria so that a portion of the code, which satisfies the one or more semantic search criteria, is flagged. A code modification query is a semantic code query that causes at least a portion of code to be modified or deleted. It will be recognized that a semantic code query may be categorized among any one or more of the aforementioned categories. For instance, a semantic search query may also constitute a code analysis query and/or a code modification query.

A compiler may be configured to generate an object model, which represents source code. The object model includes a semantic tree, which indicates a semantic meaning of each of one or more portions of the source code. For instance, the semantic tree may be generated from a syntax tree by adding semantic information about the portion(s) of the source code to the syntax tree. A syntax tree is a tree that represents a syntactic structure of source code. For example, a syntax tree may include all syntax nodes and tokens corresponding to each document in a project. A syntax node is a group of continuous syntax tokens in a document that have a semantic meaning, such as a method declaration, a type declaration, a line of executable code, and so on. A syntax token is a group of continuous text characters in a document that have a semantic meaning, such as a keyword, identifier, operator, and so on.

FIG. 5 depicts an example code snippet 500, representing an example semantic code query, in accordance with an embodiment. The code snippet 500 is configured to find all public methods in a solution with a specific attribute applied to them. A solution is a collection of related projects that can (a) reference each other or (b) access types and methods from each other. For instance, an IDE may allow a user to open one solution at a time for editing, building, testing, etc. A new instance of the IDE would be needed for working on a different solution.

In the code snippet 500, "Methods" represent all methods exposed by the object model of the compiler. "From", "where", and "select" are clauses, which may be common in existing query languages, such as SQL. "IsPublic" and "GetAttributes" are public properties exposed in the public API of the compiler on the method interface. Accordingly, it can be seen that in the embodiment of FIG. 5, the code query language is an amalgamation of standard clauses from a typical query language and existing public APIs and object models exposed from the compiler platform to provide a novel set of source code semantics-based features at various layers of the development tool chain. For instance, Language Integrated Query (LINQ) technologies may be used to implement at least some of the example techniques (e.g., by combining SQL and code analyzers). LINQ is a Microsoft NET framework component that adds native data querying capabilities to NET languages. LINQ extends the NET languages by adding query expressions, which are similar to SQL statements and which are usable to extract and process data from arrays, enumerable classes, XML documents, relational databases, and third-party data sources.

Example techniques described herein have a variety of benefits as compared to conventional techniques for executing code queries. For instance, the example techniques may be capable of tightly integrating a code query language with a compiler platform (e.g., from the core compiler layer through the IDE layer). Such tight integration may enable query-based functionality in a command line build as part of a continuous integration pipeline. The code query language may be based on existing public application programming interfaces (APIs), and object models (including syntactic and semantic trees therein) that are exposed by compiler platform. Accordingly, the example techniques do not require designing a completely new grammar for the code query language.

The example techniques enable code queries to be integrated as inputs to a compiler, meaning that the code queries can be parsed, interpreted, and executed during a build to report diagnostics, which may be enforced as build time errors. The example techniques may provide semantics-based code search, code analysis, and automated code transformation as inner loop scenarios executed by arbitrary developers and used during active code development. This is in contrast to conventional techniques, which typically are implemented in an offline code analysis phase or a separate code analysis tool, are used by a limited set of developers on a team, and are performed at specific times in a product cycle dedicated toward improving code quality ad reducing technical debt. The example techniques may be capable of executing a semantic code query in a single compilation.

The example techniques are capable of converting multiple semantic criteria into query generation and query execution operations (e.g., to provide or enhance "find and replace" functionality in an IDE or a standalone tool (e.g., command line functionality)). The example techniques are capable of automatically generating a semantic code query from semantics-based find and replace user experience (UX). The semantic code query may be generated using artificial intelligence (AI) techniques, code base profiling, and larger code quality trends in public GitHub repositories. The semantic code query may be loaded into a query editor for customization and execution. A query editor is an editor for writing, editing, and executing code queries. The editor may be powered by a completion and intellisense engine to help developers easily work with code queries. The query editor may support loading existing queries from files into the query editor and saving queries from the query editor into files. Accordingly, a query scenario may be quickly bootstrapped from the UX and customized for more fine-grained search.

The example techniques may reduce an amount of time and/or resources (e.g., processor cycles, memory, network bandwidth) that is consumed to generate, execute, and/or maintain a semantic code query. For instance, the time and resources consumed for initial development and maintenance of the code query language may be reduced, as compared to conventional techniques, because the tight integration of the code query language with the compiler platform may ensure that maintenance happens implicitly with the maintenance of the compiler and other parts of the development platform. Critical bug fixes, servicing releases, performance enhancements, and API fixes that happen in the compiler and the IDE can automatically flow into and benefit the query-based scenarios. Building on top of the compiler and development platform means that support for any new language features, new public APIs, object model, and tree enhancements are directly incorporated into the code query language and the other query-related tooling. For example, code completion functionality (e.g., intellisense) in a query editor does not need to be changed to support the new public APIs and the object model and tree enhancements; rather, they would automatically show up in the query editor in the newer release of the IDE built against the compiler platform with these enhancements.

In an IDE example, query execution in the IDE during typing can share the same compilations, parsed syntax trees, and bound semantic trees that are used by other parts of the IDE, such as background analysis to compute compiler warnings and errors and live code analysis diagnostics. This may help to avoid duplicate symbols and compilations from being computed and loaded in memory, which may save time and memory for query execution. In a continuous integration example, tightly integrating the code query language with the compiler platform may enable running queries in parallel with the build and operating on the same symbols and trees that are computed for the build, which may save time and memory.

The example techniques may reduce an amount of time and/or resources that is consumed to write automatic code generators, which transform semantic code queries into compilable source code for a code analysis or code transformation plugin (e.g., because the code query language and code analysis and transformation plugins are built on top of the same public APIs and object models that are exposed by the compiler platform).

By reducing the time and resources consumed for initial development and maintenance of the code query language, efficiency of a user (e.g., developer or manager) and quality of the user experience may be increased. By building the code query language on top of the compiler platform, the API of the compiler may provide a consistent user experience with other items built on top of the platform, such as other parts of an IDE, code analysis plugins, code refactoring and transformation extensions, and other standalone tools. The learning curve for a user of the example techniques may be relatively low because the user need not learn a completely different API and object model for the code query language.

FIG. 1 is a block diagram of an example semantic query-enabled compilation system 100 in accordance with an embodiment. Generally speaking, the semantic query-enabled compilation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the semantic query-enabled compilation system 100 uses a semantic tree of a semantic query-enabled compiler 108 to execute a semantic code query against source code.

As shown in FIG. 1, the semantic query-enabled compilation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; AppCode® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force.com® platform developed and distributed by Salesforce, Inc. It will be recognized that the example techniques described herein may be implemented using a developer tool. In accordance with some example embodiments, the servers 106A-106N are configured to host respective Web sites, so that the Web sites are accessible to users of the semantic query-enabled compilation system 100.

The first server(s) 106A are shown to include the semantic query-enabled compiler 108 for illustrative purposes. The semantic query-enabled compiler 108 is configured to use a semantic tree to execute a semantic code query against source code. In an example implementation, the semantic query-enabled compiler 108 generates an object model that represents the source code (e.g., during a build of the source code or as the semantic query-enabled compiler 108 runs in the background of an IDE typing session). The object model includes the semantic tree. The semantic tree represents a meaning of strings in the source code based at least in part on a grammar. The grammar is defined at least in part by an application programming interface (API) that is exposed by the semantic query-enabled compiler 108 and the object model. The semantic query-enabled compiler 108 receives the semantic code query, which is written in a code query language associated with the semantic query-enabled compiler 108, as an input to the semantic query-enabled compiler 108 (e.g., during a build of the source code or as the semantic query-enabled compiler 108 runs in the background of an IDE typing session). The semantic code query includes search criteria. The semantic query-enabled compiler 108 determines a portion of the source code that satisfies the search criteria by executing the semantic code query against the semantic tree using the API that is exposed by the semantic query-enabled compiler 108. The semantic query-enabled compiler 108 provides a result of the semantic code query. The result identifies the portion of the source code that satisfies the search criteria.

The semantic query-enabled compiler 108 may be implemented in various ways to use a semantic tree to execute a semantic code query against source code, including being implemented in hardware, software, firmware, or any combination thereof. For example, the semantic query-enabled compiler 108 may be implemented as computer program code configured to be executed in one or more processors. In another example, at least a portion of the semantic query-enabled compiler 108 may be implemented as hardware logic/electrical circuitry. For instance, at least a portion of the semantic query-enabled compiler 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the semantic query-enabled compiler 108 may be (or may be included in) a developer tool, though the scope of the example embodiments is not limited in this respect.

The semantic query-enabled compiler 108 is shown to be incorporated in the first server(s) 106A for illustrative purposes and is not intended to be limiting. It will be recognized that the semantic query-enabled compiler 108 (or any portion(s) thereof) may be incorporated in any one or more of the user devices 102A-102M. For example, client-side aspects of the semantic query-enabled compiler 108 may be incorporated in one or more of the user devices 102A-102M, and server-side aspects of semantic query-enabled compiler 108 may be incorporated in the first server(s) 106A. In another example, the semantic query-enabled compiler 108 may be distributed among the user devices 102A-102M. In yet another example, the semantic query-enabled compiler 108 may be incorporated in a single one of the user devices 102A-102M. In another example, the semantic query-enabled compiler 108 may be distributed among the server(s) 106A-106N. In still another example, the semantic query-enabled compiler 108 may be incorporated in a single one of the servers 106A-106N.

Figure 2:
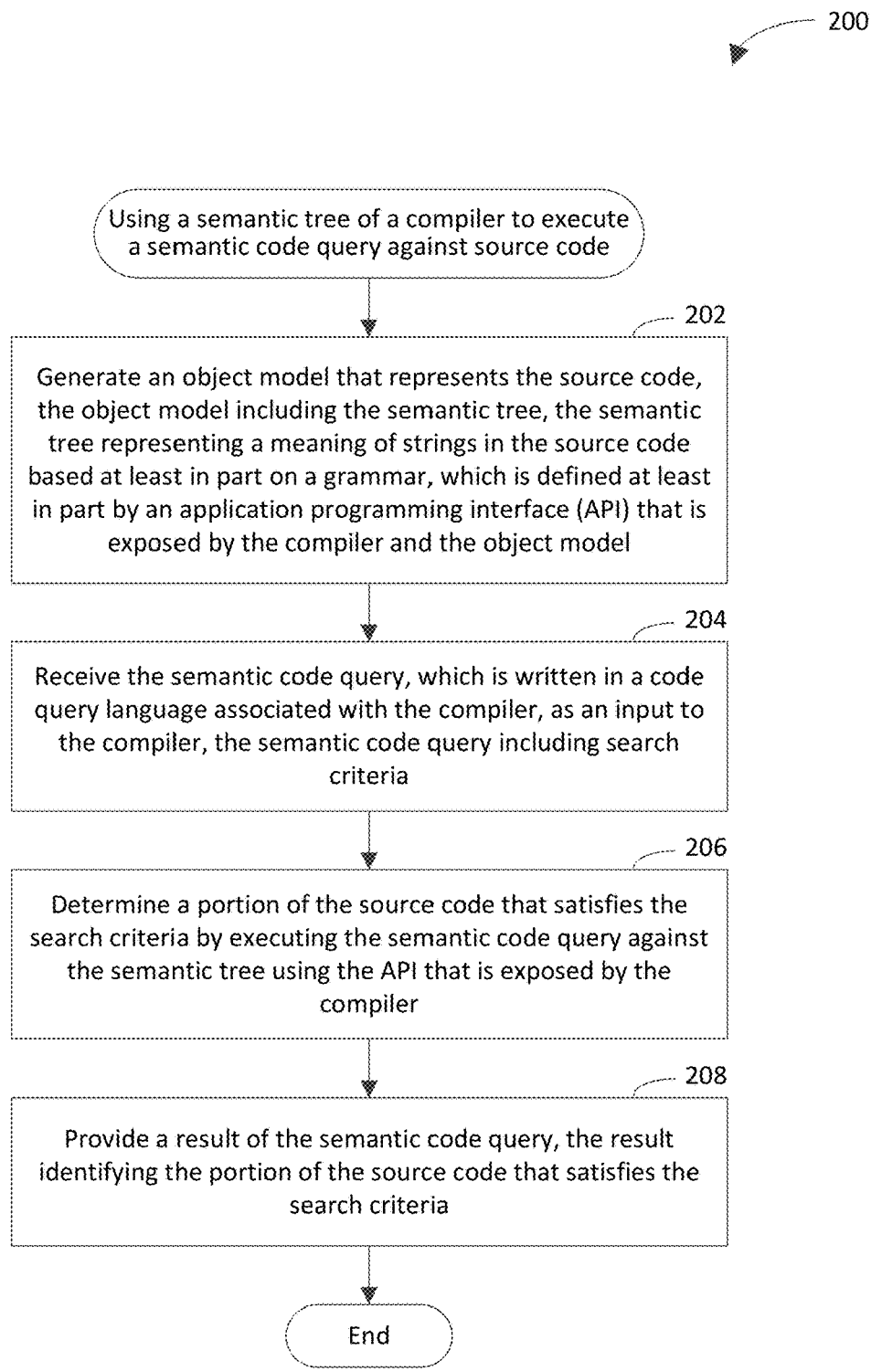
FIG. 2-3 depict flowcharts of example methods for using a semantic tree of a compiler to execute a semantic code query against source code in accordance with embodiments.
Figure 3:
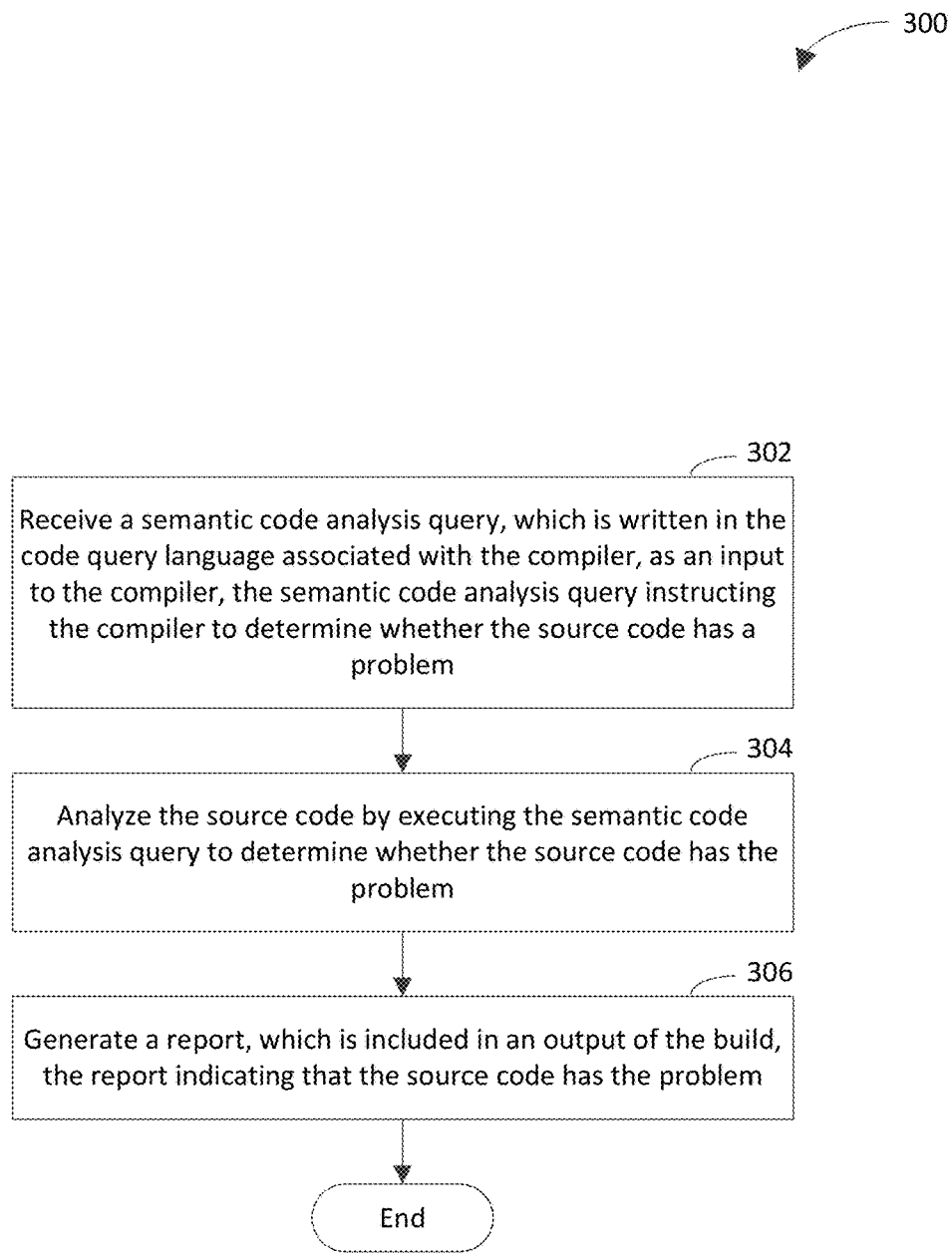
Figure 4:
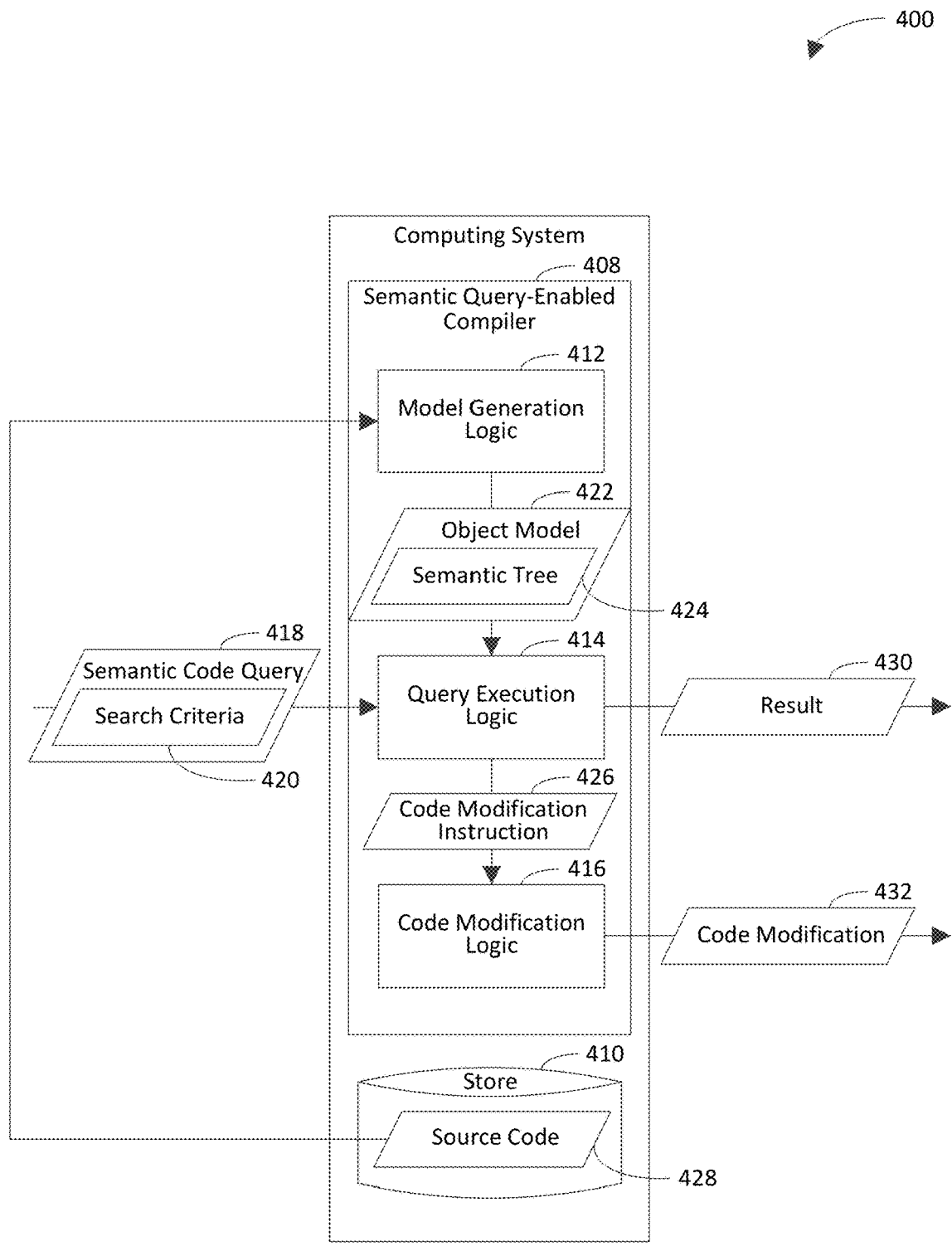
FIG. 4 is a block diagram of an example computing system in accordance with an embodiment.

FIG. 2-3 depict flowcharts 200 and 300 of example methods for using a semantic tree of a compiler to execute a semantic code query against source code in accordance with embodiments. Flowcharts 200 and 300 may be performed by the first server(s) 106A shown in FIG. 1, for example. For illustrative purposes, flowcharts 200 and 300 are described with respect to computing system 400 shown in FIG. 4, which is an example implementation of the first server(s) 106A. As shown in FIG. 4, the computing system 400 includes a semantic query-enabled compiler 408 and a store 410. The semantic query-enabled compiler 408 includes model generation logic 412, query execution logic 414, and code modification logic 416. The store 410 may be any suitable type of store. One type of store is a database. For instance, the store 410 may be a relational database, an entity-relationship database, an object database, an object relational database, an extensible markup language (XML) database, etc. The store 410 is shown to store source code 428 for non-limiting, illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, an object model that represents the source code is generated. The object model includes the semantic tree. The semantic tree represents a meaning of strings in the source code based at least in part on a grammar, which is defined at least in part by an application programming interface (API) that is exposed by the compiler and the object model. In an example implementation, the model generation logic 412 generates an object model 422, which represents the source code 428. The object model 422 includes a semantic tree 424, which represents a meaning of strings in the source code 428 based at least in part on a grammar that is defined at least in part by an API that is exposed by the semantic query-enabled compiler 408 and the object model 422. The semantic query-enabled compiler 408 may be a compiler-as-a-service, though the example embodiments are not limited in this respect.

At step 204, the semantic code query, which is written in a code query language associated with the compiler, is received as an input to the compiler. For instance, the semantic code query may be received while the source code is being written and/or debugged. It will be recognized that the semantic code query may be initiated in any of a variety of ways, including but not limited to a user opening a search box, a file, a user interface (UI), or a complete editor; the user performing a single action (e.g., performing a keyboard shortcut or clicking a glyph that is exposed by the compiler); the semantic code query being included in the source code. If the semantic code query is included in the source code, the compiler may be configured to remove the semantic code query as a result of the semantic code query being executed. It will be further recognized that the user may modify a template query to generate the semantic code query. The semantic code query includes search criteria. In an example implementation, the query execution logic 414 receives the semantic code query 418, which is written in a code query language associated with the semantic query-enabled compiler 408, as an input to the semantic query-enabled compiler 408. The semantic code query 418 includes search criteria 420.

In an example embodiment, the code query language being associated with the compiler enables query-based functionality in a command line build as part of a continuous integration pipeline and avoids a need to design a completely new grammar for the code query language.

In another example embodiment, the code query language being associated with the compiler reduces time and resources consumed for initial development and maintenance of the code query language, which may increase efficiency of a user (e.g., developer or manager) and quality of the user experience.

In yet another example embodiment, the code query language is integrated into a software development kit (SDK) of the compiler. An SDK is a set of software development tools that are usable to generate applications for a particular platform. Examples of a platform include but are not limited to a hardware component, an operating system, a compiler, and a programming language. The SDK may provide prebuilt components (e.g., software components) that a developer can integrate into an application, rather than having to build each of the components manually.

At step 206, a portion of the source code that satisfies the search criteria is determined by executing the semantic code query against the semantic tree using the API that is exposed by the compiler. For instance, the semantic code query may be executed at source code editing time (e.g., when run in an IDE) OR at build time (e.g., when run in continuous integration (CI)). Using the API that is exposed by the compiler to execute the semantic code query against the semantic tree may reduce an amount of time and/or resources (e.g., processor cycles, memory, network bandwidth) that is consumed to execute the semantic code query. In an example implementation, the query execution logic 414 determines a portion of the source code 428 that satisfies the search criteria 420 by executing the semantic code query 418 against the semantic tree 424 using the API that is exposed by the semantic query-enabled compiler 408.

In an example embodiment, the semantic code query further includes a code analysis instruction, which indicates that the portion of the source code that satisfies the search criteria is to be analyzed to determine whether the portion satisfies a specified criterion that indicates a problem. In accordance with this embodiment, executing the semantic code query at step 206 includes analyzing the portion of the source code to identify a problem associated with the source code based on the portion of the source code satisfying the specified criterion. For instance, the portion of the source code may be compared to reference code (e.g., a reference pattern) to determine that the portion includes the reference code. The portion of the source code including the reference code may indicate that the source code has the problem. The portion of the source code not including the reference code may indicate that the source code does not have the problem. In further accordance with this embodiment, executing the semantic code query at step 206 further includes generating a report, which indicates that the source code has the problem. For instance, the problem may be that compilation of the source code causes a compiler error.

In another example embodiment, the semantic code query includes a code search instruction and a code modification instruction. The code search instruction indicates that the source code is to be searched to identify the portion of the source code that satisfies the search criteria. The code modification instruction indicates that the portion of the source code that satisfies the search criteria is to be modified or deleted. In accordance with this embodiment, executing the semantic code query at step 206 includes determining the portion of the source code that satisfies the search criteria by executing the code search instruction. In further accordance with this embodiment, executing the semantic code query at step 206 further includes modifying or deleting the portion of the source code by executing the code modification instruction. For instance, the portion of the source code may be modified by inserting additional code into the source code. The portion of the source code may be deleted by replacing the portion of the source code with replacement code.

At step 208, a result of the semantic code query is provided. The result identifies the portion of the source code that satisfies the search criteria. Providing the result of the semantic code query at step 208 may increase efficiency of a user and/or quality of the user experience. In an example implementation, the query execution logic 414 provides a result 430 of the semantic code query 418. The result 430 identifies the portion of the source code 428 that satisfies the search criteria 420.

In an example embodiment, the result is provided at step 208 in an instance of an integrated development environment (IDE) in which the source code is built. In another example embodiment, the result is provided at step 208 in an instance of a command line build in which the source code is built. For instance, the result may be provided in a continuous integration, continuous delivery (CI/CD) implementation. For example, the compiler may not run within an IDE.

In an example public method embodiment, the source code includes multiple methods. In accordance with this embodiment, the semantic code query is a semantic search query that requests a subset of the methods in the source code such that each method in the subset is a public method to which a designated attribute is applied. Examples of an attribute include but are not limited to metadata associated with source code and declarative information associated with the source code. In further accordance with this embodiment, determining the portion of the source code that satisfies the search criteria at step 206 includes determining the subset of the methods in the source code based on each method in the subset being a public method to which the designated attribute is applied. In further accordance with this embodiment, the result, which is provided at step 208, identifies each method in the subset. An example code snippet 500 that may be used to implement this embodiment is shown in FIG. 5. For instance, the code snippet 500 is configured to find all public methods in a solution with a specific attribute applied to them. The code snippet 500 is described in further detail above.

In an example method call embodiment, the source code includes multiple method calls. In accordance with this embodiment, the semantic code query is a semantic search query that requests a subset of the method calls in the source code such that each method call in the subset is within executable code of a specified type and is configured to call to a method having a specified name. In accordance with this embodiment, determining the portion of the source code that satisfies the search criteria at step 206 includes determining the subset of the method calls in the source code based on each method call in the subset being within executable code of the specified type and being configured to call to a method having the specified name. In further accordance with this embodiment, the result, which is provided at step 208, identifies each method call in the subset. An example code snippet 600 that may be used to implement this embodiment is shown in FIG. 6. For instance, the code snippet 600 is configured to find all calls to methods named "M" in the project, but only inside an executable for a specified type "T" or sub-types of "T".

In another example public method embodiment, the source code includes multiple methods. In accordance with this embodiment, the semantic code query is a semantic search query that requests a subset of the methods in the source code such that each method in the subset is a public method that is configured to return a specified type of data structure. In further accordance with this embodiment, determining the portion of the source code that satisfies the search criteria at step 206 includes determining the subset of the methods in the source code based on each method in the subset being a public method that is configured to return the specified type of data structure. In further accordance with this embodiment, the result, which is provided at step 208, identifies each method in the subset. An example code snippet 700 that may be used to implement this embodiment is shown in FIG. 7. For instance, the code snippet 700 is configured to find all public methods that have a return type "T".

In an example field embodiment, the source code includes multiple fields. In accordance with this embodiment, the semantic code query is a code analysis query that requests a subset of the fields in the source code such that each field in the subset is a non-static field having an attribute that is defined to be applicable to only static fields. In further accordance with this embodiment, determining the portion of the source code that satisfies the search criteria at step 206 includes determining the subset of the fields in the source code based on each field in the subset being a non-static field having an attribute that is defined to be applicable to only static fields. In further accordance with this embodiment, the result, which is provided at step 208, identifies each field in the subset. An example code snippet 800 that may be used to implement this embodiment is shown in FIG. 8. For instance, the code snippet 800 is configured to find all non-static fields that have a specified attribute applied to them that should be applied only to static fields.

In another example method embodiment, the source code includes multiple methods. In accordance with this embodiment, the semantic code query is a semantic search query that requests a subset of the methods in the source code such that each method in the subset includes a number of lines of code that is greater than or equal to a threshold number. In further accordance with this embodiment, determining the portion of the source code that satisfies the search criteria at step 206 includes determining the subset of the methods in the source code based on each method in the subset including a number of lines of code that is greater than or equal to the threshold number. In further accordance with this embodiment, the result, which is provided at step 208, identifies each method in the subset. An example code snippet 1000 that may be used to implement this embodiment is shown in FIG. 10. For instance, the code snippet 1000 is configured to find complex methods.

In an example type embodiment, the source code includes multiple types. In accordance with this embodiment, the semantic code query is a semantic search query that requests a subset of the types in the source code such that each type in the subset is included in a first namespace of the source code and references a type in a second namespace of the source code. A namespace is a set of signs (a.k.a. names) that are used to identify and refer to objects. For instance, namespaces may be used to organize code into logical groups and to prevent name collisions that can occur especially when the code has multiple libraries. In further accordance with this embodiment, determining the portion of the source code that satisfies the search criteria at step 206 includes determining the subset of the types in the source code based on each type in the subset being included in the first namespace of the source code and referencing a type in the second namespace of the source code. In further accordance with this embodiment, the result, which is provided at step 208, identifies each type in the subset. An example code snippet 1100 that may be used to implement this embodiment is shown in FIG. 11. For instance, the code snippet 1100 is configured to find types using some types.

In another example type embodiment, the source code includes multiple types. In accordance with this embodiment, the semantic code query is a semantic search query that requests a subset of the types in the source code such that each type in the subset is a nested type that is defined in another type of the plurality of types. A nested type is type that is defined in (e.g., inside, within) another type. In accordance with this embodiment, determining the portion of the source code that satisfies the search criteria at step 206 includes determining the subset of the types in the source code based on each type in the subset being a nested type that is defined in another type of the plurality of types. In further accordance with this embodiment, the result, which is provided at step 208, identifies each type in the subset. An example code snippet 1200 that may be used to implement this embodiment is shown in FIG. 12. For instance, the code snippet 1200 is configured to find all nested types.

In an example TODO comment embodiment, the source code includes multiple TODO comments that indicate dates. A TODO comment is a programmer-readable explanation or annotation in source code. In accordance with this embodiment, the semantic code query is a semantic search query that requests a subset of the TODO comments in the source code such that each TODO comment in the subset indicates a data that precedes a reference date. In further accordance with this embodiment, determining the portion of the source code that satisfies the search criteria at step 206 includes determining the subset of the TODO comments in the source code based on each TODO comment in the subset indicating a data that precedes the reference date. In further accordance with this embodiment, the result, which is provided at step 208, identifies each TODO comment in the subset. An example code snippet 1300 that may be used to implement this embodiment is shown in FIG. 13. For instance, the code snippet 1300 is configured to find specified TODO comments.

In an example variable embodiment, the source code includes multiple variables. In accordance with this embodiment, the semantic code query is a code analysis query that requests a subset of the variables in the source code such that each variable in the subset is defined and the respective variable is not used. In further accordance with this embodiment, determining the portion of the source code that satisfies the search criteria at step 206 includes determining the subset of the variables in the source code based on each variable in the subset being defined and the respective variable not being used. In an aspect, each variable in the subset is included in a method that does not include a reference to the respective variable. In further accordance with this embodiment, the result, which is provided at step 208, identifies each variable in the subset. An example code snippet 1400 that may be used to implement this embodiment is shown in FIG. 14. For instance, the code snippet 1400 is configured to find all unused variables in a project.

In another example method embodiment, the source code includes multiple methods. In accordance with this embodiment, the semantic code query is a code analysis query that requests a subset of the methods in the source code such that each method in the subset is defined and the respective method is not called. In further accordance with this embodiment, determining the portion of the source code that satisfies the search criteria at step 206 includes determining the subset of the methods in the source code based on each method in the subset being defined and the respective method not being called. In further accordance with this embodiment, the result, which is provided at step 208, identifies each method in the subset.

In another example method embodiment, the source code includes multiple methods. In accordance with this embodiment, the semantic code query is a code analysis query that requests a subset of the methods in the source code such that each method in the subset is an asynchronous method that does not include a parameter that enables the respective asynchronous method to be cancelled. In further accordance with this embodiment, determining the portion of the source code that satisfies the search criteria at step 206 includes determining the subset of the methods in the source code based on each method in the subset being an asynchronous method that does not include a parameter that enables the respective asynchronous method to be cancelled. In further accordance with this embodiment, the result, which is provided at step 208, identifies each method in the subset. An example code snippet 1500 that may be used to implement this embodiment is shown in FIG. 15. For instance, the code snippet 1500 is configured to find all asynchronous methods whose signature does not have a CancellationToken parameter.

In an example code pattern embodiment, the source code includes multiple code patterns. In accordance with this embodiment, the semantic code query is a code analysis query that requests a subset of the code patterns in the source code such that each code pattern in the subset includes a lock statement that is configured to call a public method. In further accordance with this embodiment, determining the portion of the source code that satisfies the search criteria at step 206 includes determining the subset of the code patterns in the source code based on each code pattern in the subset including a lock statement that is configured to call a public method. In further accordance with this embodiment, the result, which is provided at step 208, identifies each code pattern in the subset.

An example code snippet 1600 that may be used to implement this embodiment is shown in FIG. 16. For instance, the code snippet 1600 is configured to find all code patterns in which a public method is called within a lock statement. A lock statement is a statement that is used in multi-thread code to ensure that only one thread of code executes a designated block of code at a time. A statement is a representation of an action that is to be performed by a program. Examples of an action include but are not limited to declaring a variable, assigning a value, calling a method, looping through a collection, and branching to a block of code. The code snippet 1600 references symbols and expressions. A symbol is a collection of nodes that represent a designated kind of entity that represents a declaration (e.g., a method declaration, a type declaration, or a variable declaration). Each symbol is associated with a syntax node that declares the respective symbol ("symbol declaration") and can have one or more syntax nodes that use the respective symbol ("symbol reference"). An expression is a set of operands and operators that are capable of being evaluated to a single value. Examples of an operand include but are not limited to a variable, a literal, and a method call.

In some example embodiments, one or more steps 202, 204, 206, and/or 208 of flowchart 200 are not performed. Moreover, steps in addition to or in lieu of steps 202, 204, 206, and/or 208 may be performed. For instance, in an example field embodiment, the source code includes multiple attributes associated with multiple fields. In accordance with this embodiment, the semantic code query is a code modification query that requests deletion of each instance of an attribute in the source code that is defined not to be applicable to a static field and that is applied to a static field. In further accordance with this embodiment, determining the portion of the source code that satisfies the search criteria at step 206 includes determining each instance of an attribute in the source code that is defined not to be applicable to a static field and that is applied to a static field. For instance, the query execution logic 414 may make the determination. In a first example, the query execution logic 414 may generate code modification instruction 426, which indicates that each instance of an attribute in the source code 428 that is defined not to be applicable to a static field and that is applied to a static field is to be deleted. In another example, the semantic code query 418 may include the code modification instruction 426, and the query execution logic 414 may forward the code modification instruction 426 the code modification logic 416. In further accordance with this embodiment, the method of flowchart 200 further includes deleting each instance of an attribute in the source code that is defined not to be applicable to a static field and that is applied to a static field. For instance, the code modification logic 416 may perform a code modification 432 that includes deleting each instance of an attribute in the source code 428 that is defined not to be applicable to a static field and that is applied to a static field. An example code snippet 900 that may be used to implement this embodiment is shown in FIG. 9. For instance, the code snippet 900 is configured to remove all attributes named "NotForStaticAttribute" on static fields.

In another example variable embodiment, the source code includes multiple variables. In accordance with this embodiment, the semantic code query is a code modification query that requests that each local variable in the source code having a name that starts with an uppercase letter be renamed such that the respective name starts with a lowercase letter. In further accordance with this embodiment, determining the portion of the source code that satisfies the search criteria at step 206 includes determining each local variable in the source code having a name that starts with an uppercase letter. In further accordance with this embodiment, the method of flowchart 200 further includes renaming each local variable in the source code having a name that starts with an uppercase letter such that the respective name starts with a lowercase letter. For instance, the code modification logic 416 may rename each local variable in the source code 428 having a name that starts with an uppercase letter such that the respective name starts with a lowercase letter. An example code snippet 1700 that may be used to implement this embodiment is shown in FIG. 17. For instance, the code snippet 1700 is configured to rename all local variables whose name starts with an uppercase letter to instead start with a lowercase letter.

In yet another example embodiment, the method of flowchart 200 further includes one or more of the steps shown in flowchart 300 of FIG. 3. As shown in FIG. 3, the method of flowchart 300 begins at step 302. In step 302, a semantic code analysis query, which is written in the code query language associated with the compiler, is received as an input to the compiler. The semantic code analysis query instructs the compiler to determine whether the source code has a problem. In an example implementation, the semantic code query 418 received by the query execution logic 414 is configured as a semantic code analysis query. In accordance with this implementation, the semantic code analysis query instructs the semantic query-enabled compiler 408 to determine whether the source code 428 has a problem.

At step 304, the source code is analyzed by executing the semantic code analysis query to determine whether the source code has the problem. In an example implementation, the query execution logic 414 analyzes the source code 428 by executing the semantic code analysis query to determine whether the source code 248 has the problem.

At step 306, a report, which is included in an output of the build is generated (e.g., as a result of determining that the source code has the problem). The report indicates that the source code has the problem. In an example implementation, the query execution logic 414 generates the report, indicating that the source code 428 has the problem.

It will be recognized that the computing system 400 may not include one or more of the semantic query-enabled compiler 408, the store 410, the model generation logic 412, the query execution logic 414, and/or the code modification logic 416. Furthermore, the computing system 400 may include components in addition to or in lieu of the semantic query-enabled compiler 408, the store 410, the model generation logic 412, the query execution logic 414, and/or the code modification logic 416.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the semantic query-enabled compiler 108, the semantic query-enabled compiler 408, the model generation logic 412, the query execution logic 414, the code modification logic 416, flowchart 200, and/or flowchart 300 may be implemented in hardware, software, firmware, or any combination thereof.

For example, any one or more of the semantic query-enabled compiler 108, the semantic query-enabled compiler 408, the model generation logic 412, the query execution logic 414, the code modification logic 416, flowchart 200, and/or flowchart 300 may be implemented, at least in part, as computer program code configured to be executed in one or more processors.

In another example, any one or more of the semantic query-enabled compiler 108, the semantic query-enabled compiler 408, the model generation logic 412, the query execution logic 414, the code modification logic 416, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 18:
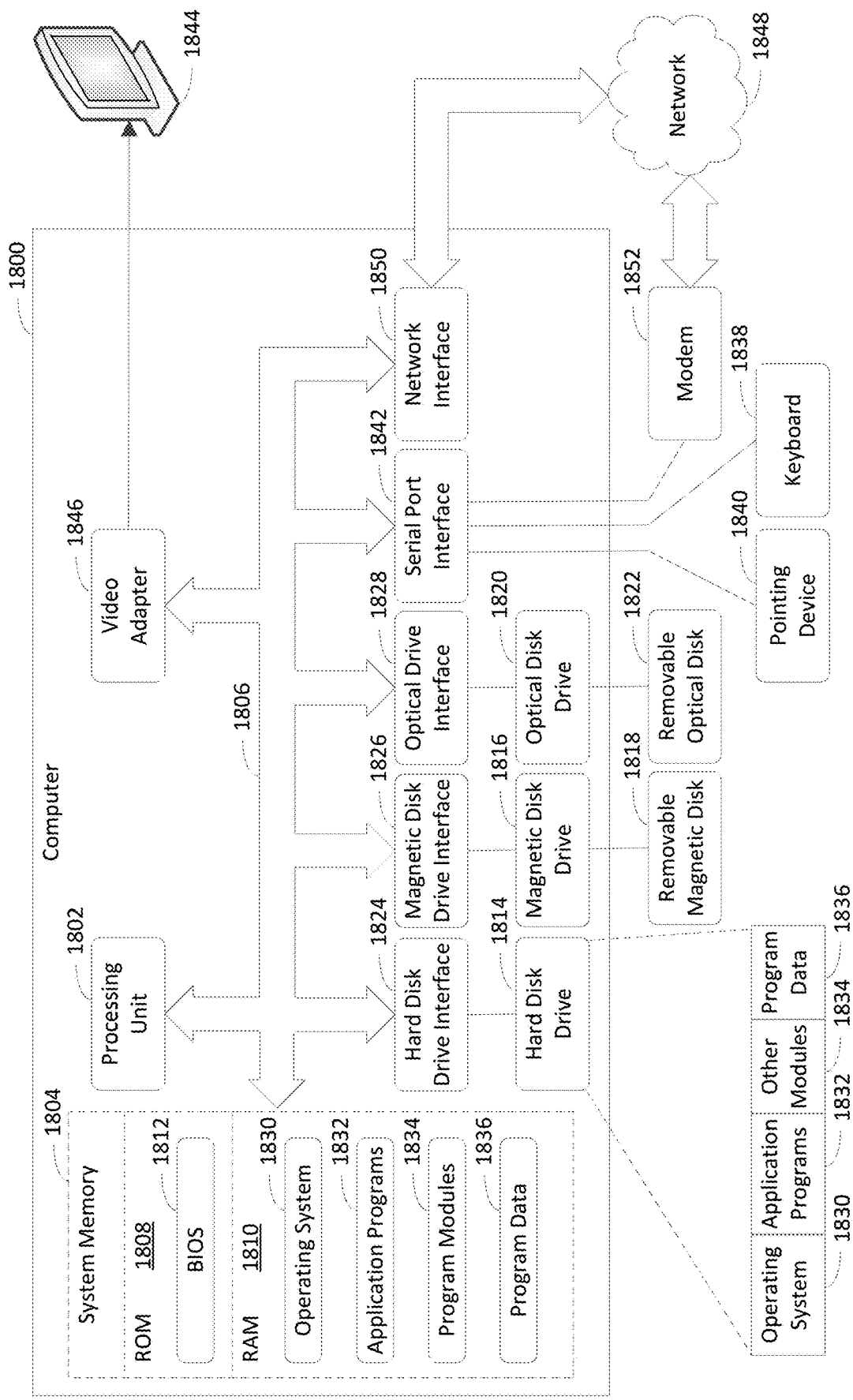
FIG. 18 depicts an example computer in which embodiments may be implemented.

III. Further Discussion of Some Example Embodiments (A1) An example system (FIG. 1, 102A-102M, 106A-106N; FIG. 4, 400; FIG. 18, 1800) to use a semantic tree (FIG. 4, 424) of a compiler (FIG. 1, 108; FIG. 4, 408) to execute a semantic code query (FIG. 4, 418) against source code (FIG. 4, 428) comprises a memory (FIG. 18, 1804, 1808, 1810) and a processing system (FIG. 18, 1802) coupled to the memory. The processing system is configured to execute the compiler. The compiler is configured to generate (FIG. 2, 202) an object model (FIG. 4, 422) that represents the source code. The object model includes the semantic tree. The semantic tree represents a meaning of strings in the source code based at least in part on a grammar, which is defined at least in part by an application programming interface (API) that is exposed by the compiler and the object model. The compiler is further configured to receive (FIG. 2, 204) the semantic code query, which is written in a code query language associated with the compiler, as an input to the compiler. The semantic code query includes search criteria (FIG. 4, 420). The compiler is further configured to determine (FIG. 2, 206) a portion of the source code that satisfies the search criteria by executing the semantic code query against the semantic tree using the API that is exposed by the compiler. The compiler is further configured to provide (FIG. 2, 208) a result (FIG. 4, 430) of the semantic code query. The result identifies the portion of the source code that satisfies the search criteria.

(A2) In the example system of A1, wherein the compiler is configured to: provide the result in an instance of an integrated development environment (IDE) in which the source code is built.

(A3) In the example system of any of A1-A2, wherein the compiler is configured to: provide the result in an instance of a command line build in which the source code is built.

(A4) In the example system of any of A1-A3, wherein the code query language is integrated into a software development kit (SDK) of the compiler.

(A5) In the example system of any of A1-A4, wherein the semantic code query further includes a code analysis instruction, indicating that the portion of the source code that satisfies the search criteria is to be analyzed to determine whether the portion satisfies a specified criterion that indicates a problem; and wherein the compiler is configured to, based on execution of the code analysis instruction, perform the following operations: analyze the portion of the source code to identify the problem associated with the source code based on the portion of the source code satisfying the specified criterion; and generate a report, which indicates that the source code has the problem.

(A6) In the example system of any of A1-A5, wherein the compiler is further configured to: receive a semantic code analysis query, which is written in the code query language associated with the compiler, as an input to the compiler, the semantic code analysis query instructing the compiler to determine whether the source code has a problem; analyze the source code by executing the semantic code analysis query to determine whether the source code has the problem; and generate a report, which is included in an output of the build, the report indicating that the source code has the problem.

(A7) In the example system of any of A1-A6, wherein the semantic code query includes a code search instruction and a code modification instruction, the code search instruction indicating that the source code is to be searched to identify the portion of the source code that satisfies the search criteria, the code modification instruction indicating that the portion of the source code that satisfies the search criteria is to be modified or deleted; and wherein the compiler is configured to: determine the portion of the source code that satisfies the search criteria by executing the code search instruction; and modify or delete the portion of the source code by executing the code modification instruction.

(A8) In the example system of any of A1-A7, wherein the source code includes a plurality of methods; wherein the semantic code query is a semantic search query that requests a subset of the plurality of methods in the source code such that each method in the subset is a public method to which a designated attribute is applied; wherein the compiler is configured to: determine the subset of the plurality of methods in the source code based on each method in the subset being a public method to which the designated attribute is applied; and wherein the result identifies each method in the subset.

(A9) In the example system of any of A1-A8, wherein the source code includes a plurality of method calls; wherein the semantic code query is a semantic search query that requests a subset of the plurality of method calls in the source code such that each method call in the subset is within executable code of a specified type and is configured to call to a method having a specified name; wherein the compiler is configured to: determine the subset of the plurality of method calls in the source code based on each method call in the subset being within executable code of the specified type and being configured to call to a method having the specified name; and wherein the result identifies each method call in the subset.

(A10) In the example system of any of A1-A9, wherein the source code includes a plurality of methods; wherein the semantic code query is a semantic search query that requests a subset of the plurality of methods in the source code such that each method in the subset is a public method that is configured to return a specified type of data structure; wherein the compiler is configured to: determine the subset of the plurality of methods in the source code based on each method in the subset being a public method that is configured to return the specified type of data structure; and wherein the result identifies each method in the subset.

(A11) In the example system of any of A1-A10, wherein the source code includes a plurality of fields; wherein the semantic code query is a code analysis query that requests a subset of the plurality of fields in the source code such that each field in the subset is a non-static field having an attribute that is defined to be applicable to only static fields; wherein the compiler is configured to: determine the subset of the plurality of fields in the source code based on each field in the subset being a non-static field having an attribute that is defined to be applicable to only static fields; and wherein the result identifies each field in the subset.

(A12) In the example system of any of A1-A11, wherein the source code includes a plurality of attributes associated with a plurality of fields; wherein the semantic code query is a code modification query that requests deletion of each instance of an attribute of the plurality of attributes that is defined not to be applicable to a static field and that is applied to a static field; and wherein the compiler is configured to: determine each instance of an attribute of the plurality of attributes that is defined not to be applicable to a static field and that is applied to a static field; and delete each instance of an attribute of the plurality of attributes that is defined not to be applicable to a static field and that is applied to a static field.

(A13) In the example system of any of A1-A12, wherein the source code includes a plurality of methods; wherein the semantic code query is a semantic search query that requests a subset of the plurality of methods in the source code such that each method in the subset includes a number of lines of code that is greater than or equal to a threshold number; wherein the compiler is configured to: determine the subset of the plurality of methods in the source code based on each method in the subset including a number of lines of code that is greater than or equal to the threshold number; and wherein the result identifies each method in the subset.

(A14) In the example system of any of A1-A13, wherein the source code includes a plurality of types; wherein the semantic code query is a semantic search query that requests a subset of the plurality of types in the source code such that each type in the subset is included in a first namespace of the source code and references a type in a second namespace of the source code; wherein the compiler is configured to: determine the subset of the plurality of types in the source code based on each type in the subset being included in the first namespace of the source code and referencing a type in the second namespace of the source code; and wherein the result identifies each type in the subset.

(A15) In the example system of any of A1-A14, wherein the source code includes a plurality of types; wherein the semantic code query is a semantic search query that requests a subset of the plurality of types in the source code such that each type in the subset is a nested type that is defined in another type of the plurality of types; wherein the compiler is configured to: determine the subset of the plurality of types in the source code based on each type in the subset being a nested type that is defined in another type of the plurality of types; and wherein the result identifies each type in the subset.

(A16) In the example system of any of A1-A15, wherein the source code includes a plurality of TODO comments that indicate dates; wherein the semantic code query is a semantic search query that requests a subset of the plurality of TODO comments in the source code such that each TODO comment in the subset indicates a data that precedes a reference date; wherein the compiler is configured to: determine the subset of the plurality of TODO comments in the source code based on each TODO comment in the subset indicating a data that precedes the reference date; and wherein the result identifies each TODO comment in the subset.

(A17) In the example system of any of A1-A16, wherein the source code includes a plurality of variables; wherein the semantic code query is a code analysis query that requests a subset of the plurality of variables in the source code such that each variable in the subset is defined and the respective variable is not used; wherein the compiler is configured to: determine the subset of the plurality of variables in the source code based on each variable in the subset being defined and the respective variable not being used; and wherein the result identifies each variable in the subset.

(A18) In the example system of any of A1-A17, wherein the source code includes a plurality of methods; wherein the semantic code query is a code analysis query that requests a subset of the plurality of methods in the source code such that each method in the subset is defined and the respective method is not called; wherein the compiler is configured to: determine the subset of the plurality of methods in the source code based on each method in the subset being defined and the respective method not being called; and wherein the result identifies each method in the subset.

(A19) In the example system of any of A1-A18, wherein the source code includes a plurality of methods; wherein the semantic code query is a code analysis query that requests a subset of the plurality of methods in the source code such that each method in the subset is an asynchronous method that does not include a parameter that enables the respective asynchronous method to be cancelled; wherein the compiler is configured to: determine the subset of the plurality of methods in the source code based on each method in the subset being an asynchronous method that does not include a parameter that enables the respective asynchronous method to be cancelled; and wherein the result identifies each method in the subset.

(A20) In the example system of any of A1-A19, wherein the source code includes a plurality of code patterns; wherein the semantic code query is a code analysis query that requests a subset of the plurality of code patterns in the source code such that each code pattern in the subset includes a lock statement that is configured to call a public method; wherein the compiler is configured to: determine the subset of the plurality of code patterns in the source code based on each code pattern in the subset including a lock statement that is configured to call a public method; and wherein the result identifies each code pattern in the subset.

(A21) In the example system of any of A1-A20, wherein the source code includes a plurality of variables; wherein the semantic code query is a code modification query that requests that each local variable of the plurality of variables having a name that starts with an uppercase letter be renamed such that the respective name starts with a lowercase letter; and wherein the compiler is configured to: determine each local variable of the plurality of variables having a name that starts with an uppercase letter; and rename each local variable of the plurality of variables having a name that starts with an uppercase letter such that the respective name starts with a lowercase letter.

(B1) An example method of using a semantic tree (FIG. 4, 424) of a compiler (FIG. 1, 108; FIG. 4, 408) to execute a semantic code query (FIG. 4, 418) against source code (FIG. 4, 428). The method is implemented by the compiler which executes on a computing device (FIG. 1, 102A-102M, 106A-106N; FIG. 4, 400; FIG. 18, 1800). The method comprises generating (FIG. 2, 202) an object model (FIG. 4, 422) that represents the source code. The object model includes the semantic tree. The semantic tree represents a meaning of strings in the source code based at least in part on a grammar, which is defined at least in part by an application programming interface (API) that is exposed by the compiler and the object model. The method further comprises receiving (FIG. 2, 204) the semantic code query, which is written in a code query language associated with the compiler, as an input to the compiler. The semantic code query includes search criteria (FIG. 4, 420). The method further comprises determining (FIG. 2, 206) a portion of the source code that satisfies the search criteria by executing the semantic code query against the semantic tree using the API that is exposed by the compiler. The method further comprises providing (FIG. 2, 208) a result (FIG. 4, 430) of the semantic code query. The result identifies the portion of the source code that satisfies the search criteria.

(B2) In the example method of B1, wherein providing the result comprises: providing the result in an instance of an integrated development environment (IDE) in which the source code is built.

(B3) In the example method of any of B1-B2, wherein providing the result comprises: providing the result in an instance of a command line build in which the source code is built.

(B4) In the example method of any of B1-B3, wherein the code query language is integrated into a software development kit (SDK) of the compiler.

(B5) In the example method of any of B1-B4, wherein the semantic code query further includes a code analysis instruction, indicating that the portion of the source code that satisfies the search criteria is to be analyzed to determine whether the portion satisfies a specified criterion that indicates a problem; and wherein executing the semantic code query comprises: analyzing the portion of the source code to identify a problem associated with the source code based on the portion of the source code satisfying the specified criterion; and generating a report, which indicates that the source code has the problem.

(B6) In the example method of any of B1-B5, further comprising: receiving a semantic code analysis query, which is written in the code query language associated with the compiler, as an input to the compiler, the semantic code analysis query instructing the compiler to determine whether the source code has a problem; analyzing the source code by executing the semantic code analysis query to determine whether the source code has the problem; and generating a report, which is included in an output of the build, the report indicating that the source code has the problem.

(B7) In the example method of any of B1-B6, wherein the semantic code query includes a code search instruction and a code modification instruction, the code search instruction indicating that the source code is to be searched to identify the portion of the source code that satisfies the search criteria, the code modification instruction indicating that the portion of the source code that satisfies the search criteria is to be modified or deleted; and wherein executing the semantic code query comprises: determining the portion of the source code that satisfies the search criteria by executing the code search instruction; and modifying or deleting the portion of the source code by executing the code modification instruction.

(B8) In the example method of any of B1-B7, wherein the source code includes a plurality of methods; wherein the semantic code query is a semantic search query that requests a subset of the plurality of methods in the source code such that each method in the subset is a public method to which a designated attribute is applied; wherein determining the portion of the source code that satisfies the search criteria comprises: determining the subset of the plurality of methods in the source code based on each method in the subset being a public method to which the designated attribute is applied; and wherein the result identifies each method in the subset.

(B9) In the example method of any of B1-B8, wherein the source code includes a plurality of method calls; wherein the semantic code query is a semantic search query that requests a subset of the plurality of method calls in the source code such that each method call in the subset is within executable code of a specified type and is configured to call to a method having a specified name; wherein determining the portion of the source code that satisfies the search criteria comprises: determining the subset of the plurality of method calls in the source code based on each method call in the subset being within executable code of the specified type and being configured to call to a method having the specified name; and wherein the result identifies each method call in the subset.

(B10) In the example method of any of B1-B9, wherein the source code includes a plurality of methods; wherein the semantic code query is a semantic search query that requests a subset of the plurality of methods in the source code such that each method in the subset is a public method that is configured to return a specified type of data structure; wherein determining the portion of the source code that satisfies the search criteria comprises: determining the subset of the plurality of methods in the source code based on each method in the subset being a public method that is configured to return the specified type of data structure; and wherein the result identifies each method in the subset.

(B11) In the example method of any of B11-B10, wherein the source code includes a plurality of fields; wherein the semantic code query is a code analysis query that requests a subset of the plurality of fields in the source code such that each field in the subset is a non-static field having an attribute that is defined to be applicable to only static fields; wherein determining the portion of the source code that satisfies the search criteria comprises: determining the subset of the plurality of fields in the source code based on each field in the subset being a non-static field having an attribute that is defined to be applicable to only static fields; and wherein the result identifies each field in the subset.

(B12) In the example method of any of B1-B11, wherein the source code includes a plurality of attributes associated with a plurality of fields; wherein the semantic code query is a code modification query that requests deletion of each instance of an attribute of the plurality of attributes that is defined not to be applicable to a static field and that is applied to a static field; wherein determining the portion of the source code that satisfies the search criteria comprises: determining each instance of an attribute of the plurality of attributes that is defined not to be applicable to a static field and that is applied to a static field; and wherein the method further comprises: deleting each instance of an attribute of the plurality of attributes that is defined not to be applicable to a static field and that is applied to a static field.

(B13) In the example method of any of B1-B12, wherein the source code includes a plurality of methods; wherein the semantic code query is a semantic search query that requests a subset of the plurality of methods in the source code such that each method in the subset includes a number of lines of code that is greater than or equal to a threshold number; wherein determining the portion of the source code that satisfies the search criteria comprises: determining the subset of the plurality of methods in the source code based on each method in the subset including a number of lines of code that is greater than or equal to the threshold number; and wherein the result identifies each method in the subset.

(B14) In the example method of any of B1-B13, wherein the source code includes a plurality of types; wherein the semantic code query is a semantic search query that requests a subset of the plurality of types in the source code such that each type in the subset is included in a first namespace of the source code and references a type in a second namespace of the source code; wherein determining the portion of the source code that satisfies the search criteria comprises: determining the subset of the plurality of types in the source code based on each type in the subset being included in the first namespace of the source code and referencing a type in the second namespace of the source code; and wherein the result identifies each type in the subset.

(B15) In the example method of any of B1-B14, wherein the source code includes a plurality of types; wherein the semantic code query is a semantic search query that requests a subset of the plurality of types in the source code such that each type in the subset is a nested type that is defined in another type of the plurality of types; wherein determining the portion of the source code that satisfies the search criteria comprises: determining the subset of the plurality of types in the source code based on each type in the subset being a nested type that is defined in another type of the plurality of types; and wherein the result identifies each type in the subset.

(B16) In the example method of any of B1-B15, wherein the source code includes a plurality of TODO comments that indicate dates; wherein the semantic code query is a semantic search query that requests a subset of the plurality of TODO comments in the source code such that each TODO comment in the subset indicates a data that precedes a reference date; wherein determining the portion of the source code that satisfies the search criteria comprises: determining the subset of the plurality of TODO comments in the source code based on each TODO comment in the subset indicating a data that precedes the reference date; and wherein the result identifies each TODO comment in the subset.

(B17) In the example method of any of B1-B16, wherein the source code includes a plurality of variables; wherein the semantic code query is a code analysis query that requests a subset of the plurality of variables in the source code such that each variable in the subset is defined and the respective variable is not used; wherein determining the portion of the source code that satisfies the search criteria comprises: determining the subset of the plurality of variables in the source code based on each variable in the subset being defined and the respective variable not being used; and wherein the result identifies each variable in the subset.

(B18) In the example method of any of B1-B17, wherein the source code includes a plurality of methods; wherein the semantic code query is a code analysis query that requests a subset of the plurality of methods in the source code such that each method in the subset is defined and the respective method is not called; wherein determining the portion of the source code that satisfies the search criteria comprises: determining the subset of the plurality of methods in the source code based on each method in the subset being defined and the respective method not being called; and wherein the result identifies each method in the subset.

(B19) In the example method of any of B1-B18, wherein the source code includes a plurality of methods; wherein the semantic code query is a code analysis query that requests a subset of the plurality of methods in the source code such that each method in the subset is an asynchronous method that does not include a parameter that enables the respective asynchronous method to be cancelled; wherein determining the portion of the source code that satisfies the search criteria comprises: determining the subset of the plurality of methods in the source code based on each method in the subset being an asynchronous method that does not include a parameter that enables the respective asynchronous method to be cancelled; and wherein the result identifies each method in the subset.

(B20) In the example method of any of B1-B19, wherein the source code includes a plurality of code patterns; wherein the semantic code query is a code analysis query that requests a subset of the plurality of code patterns in the source code such that each code pattern in the subset includes a lock statement that is configured to call a public method; wherein determining the portion of the source code that satisfies the search criteria comprises: determining the subset of the plurality of code patterns in the source code based on each code pattern in the subset including a lock statement that is configured to call a public method; and wherein the result identifies each code pattern in the subset.

(B21) In the example method of any of B1-B20, wherein the source code includes a plurality of variables; wherein the semantic code query is a code modification query that requests that each local variable of the plurality of variables having a name that starts with an uppercase letter be renamed such that the respective name starts with a lowercase letter; wherein determining the portion of the source code that satisfies the search criteria comprises: determining each local variable of the plurality of variables having a name that starts with an uppercase letter; and wherein the method further comprises: renaming each local variable of the plurality of variables having a name that starts with an uppercase letter such that the respective name starts with a lowercase letter.

(C1) An example computer program product (FIG. 18, 1818, 1822) comprising a computer-readable storage medium having instructions recorded thereon for enabling a processor-based system (FIG. 1, 102A-102M, 106A-106N; FIG. 4, 400; FIG. 18, 1800) to use a semantic tree (FIG. 4, 424) of a compiler (FIG. 1, 108; FIG. 4, 408) to execute a semantic code query (FIG. 4, 418) against source code (FIG. 4, 428) by performing operations. The operations comprise generating (FIG. 2, 202) an object model (FIG. 4, 422) that represents the source code. The object model includes the semantic tree. The semantic tree represents a meaning of strings in the source code based at least in part on a grammar, which is defined at least in part by an application programming interface (API) that is exposed by the compiler and the object model. The operations further comprise receiving (FIG. 2, 204) the semantic code query, which is written in a code query language associated with the compiler, as an input to the compiler. The semantic code query includes search criteria (FIG. 4, 420). The operations further comprise determining (FIG. 2, 206) a portion of the source code that satisfies the search criteria by executing the semantic code query against the semantic tree using the API that is exposed by the compiler. The operations further comprise providing (FIG. 2, 208) a result (FIG. 4, 430) of the semantic code query. The result identifies the portion of the source code that satisfies the search criteria.

IV. Example Computer System

FIG. 18 depicts an example computer 1800 in which embodiments may be implemented. Any one or more of the user devices 102A-102M and/or any one or more of the servers 106A-106N shown in FIG. 1 and/or computing system 400 shown in FIG. 4 may be implemented using computer 1800, including one or more features of computer 1800 and/or alternative features. Computer 1800 may be a general-purpose computing device in the form of a conventional personal computer, a mobile computer, or a workstation, for example, or computer 1800 may be a special purpose computing device. The description of computer 1800 provided herein is provided for purposes of illustration, and is not intended to be limiting. Embodiments may be implemented in further types of computer systems, as would be known to persons skilled in the relevant art(s).

As shown in FIG. 18, computer 1800 includes a processing unit 1802, a system memory 1804, and a bus 1806 that couples various system components including system memory 1804 to processing unit 1802. Bus 1806 represents one or more of any of several types of bus structures, including a memory bus or memory controller, a peripheral bus, an accelerated graphics port, and a processor or local bus using any of a variety of bus architectures. System memory 1804 includes read-only memory (ROM) 1808 and random access memory (RAM) 1810. A basic input/output system 1812 (BIOS) is stored in ROM 1808.

Computer 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1830, one or more application programs 1832, other program modules 1834, and program data 1836. Application programs 1832 or program modules 1834 may include, for example, computer program logic for implementing any one or more of (e.g., at least a portion of) the semantic query-enabled compiler 108, the semantic query-enabled compiler 408, the model generation logic 412, the query execution logic 414, the code modification logic 416, flowchart 200 (including any step of flowchart 200), and/or flowchart 300 (including any step of flowchart 300), as described herein.

A user may enter commands and information into the computer 1800 through input devices such as keyboard 1838 and pointing device 1840. Other input devices (not shown) may include a microphone, joystick, game pad, satellite dish, scanner, touch screen, camera, accelerometer, gyroscope, or the like. These and other input devices are often connected to the processing unit 1802 through a serial port interface 1842 that is coupled to bus 1806, but may be connected by other interfaces, such as a parallel port, game port, or a universal serial bus (USB).

A display device 1844 (e.g., a monitor) is also connected to bus 1806 via an interface, such as a video adapter 1846. In addition to display device 1844, computer 1800 may include other peripheral output devices (not shown) such as speakers and printers.

Computer 1800 is connected to a network 1848 (e.g., the Internet) through a network interface or adapter 1850, a modem 1852, or other means for establishing communications over the network. Modem 1852, which may be internal or external, is connected to bus 1806 via serial port interface 1842.

As used herein, the terms "computer program medium" and "computer-readable storage medium" are used to generally refer to media (e.g., non-transitory media) such as the hard disk associated with hard disk drive 1814, removable magnetic disk 1818, removable optical disk 1822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1832 and other program modules 1834) may be stored on the hard disk, magnetic disk, optical disk, ROM, or RAM. Such computer programs may also be received via network interface 1850 or serial port interface 1842. Such computer programs, when executed or loaded by an application, enable computer 1800 to implement features of embodiments discussed herein. Accordingly, such computer programs represent controllers of the computer 1800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware.

Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to use a semantic tree of a compiler to execute a semantic code query against source code, the system comprising:
   a memory; and
   a processing system coupled to the memory, the processing system configured to execute a compiler, the compiler configured to:
      generate an object model that represents the source code, the object model including the semantic tree, the semantic tree representing a meaning of strings in the source code based at least in part on a grammar, which is defined at least in part by an application programming interface (API) that is exposed by the compiler and the object model;
      receive the semantic code query, which is written in a code query language associated with the compiler, as an input to the compiler, the semantic code query including search criteria;
      determine a portion of the source code that satisfies the search criteria by executing the semantic code query against the semantic tree using the API that is exposed by the compiler; and
      provide a result of the semantic code query, the result identifying the portion of the source code that satisfies the search criteria.

2. The system of claim 1, wherein the compiler is configured to:
   provide the result in an instance of an integrated development environment (IDE) in which the source code is built.

3. The system of claim 1, wherein the compiler is configured to:
   provide the result in an instance of a command line build in which the source code is built.

4. The system of claim 1, wherein the code query language is integrated into a software development kit (SDK) of the compiler.

5. The system of claim 1, wherein the semantic code query further includes a code analysis instruction, indicating that the portion of the source code that satisfies the search criteria is to be analyzed to determine whether the portion satisfies a specified criterion that indicates a problem; and
   wherein the compiler is configured to, based on execution of the code analysis instruction, perform the following operations:
      analyze the portion of the source code to identify the problem associated with the source code based on the portion of the source code satisfying the specified criterion; and
      generate a report, which indicates that the source code has the problem.

6. The system of claim 1, wherein the compiler is further configured to:
   receive a semantic code analysis query, which is written in the code query language associated with the compiler, as an input to the compiler, the semantic code analysis query instructing the compiler to determine whether the source code has a problem;
   analyze the source code by executing the semantic code analysis query to determine whether the source code has the problem; and
   generate a report, which is included in an output of the build, the report indicating that the source code has the problem.

7. The system of claim 1, wherein the semantic code query includes a code search instruction and a code modification instruction, the code search instruction indicating that the source code is to be searched to identify the portion of the source code that satisfies the search criteria, the code modification instruction indicating that the portion of the source code that satisfies the search criteria is to be modified or deleted; and
   wherein the compiler is configured to:
      determine the portion of the source code that satisfies the search criteria by executing the code search instruction; and
      modify or delete the portion of the source code by executing the code modification instruction.

8. The system of claim 1, wherein the source code includes a plurality of variables;
   wherein the semantic code query is a code analysis query that requests a subset of the plurality of variables in the source code such that each variable in the subset is defined and the respective variable is not used;
   wherein the compiler is configured to:
      determine the subset of the plurality of variables in the source code based on each variable in the subset being defined and the respective variable not being used; and
   wherein the result identifies each variable in the subset.

9. The system of claim 1, wherein the source code includes a plurality of methods;
   wherein the semantic code query is a code analysis query that requests a subset of the plurality of methods in the source code such that each method in the subset is defined and the respective method is not called;
   wherein the compiler is configured to:
      determine the subset of the plurality of methods in the source code based on each method in the subset being defined and the respective method not being called; and
   wherein the result identifies each method in the subset.

10. A method of using a semantic tree of a compiler to execute a semantic code query against source code, the method implemented by the compiler which executes on a computing device, the method comprising:
   generating an object model that represents the source code, the object model including the semantic tree, the semantic tree representing a meaning of strings in the source code based at least in part on a grammar, which is defined at least in part by an application programming interface (API) that is exposed by the compiler and the object model;
   receiving the semantic code query, which is written in a code query language associated with the compiler, as an input to the compiler, the semantic code query including search criteria;

determining a portion of the source code that satisfies the search criteria by executing the semantic code query against the semantic tree using the API that is exposed by the compiler; and providing a result of the semantic code query, the result identifying the portion of the source code that satisfies the search criteria.

11. The method of claim 10, wherein the source code includes a plurality of methods;
   wherein the semantic code query is a semantic search query that requests a subset of the plurality of methods in the source code such that each method in the subset is a public method to which a designated attribute is applied;
   wherein determining the portion of the source code that satisfies the search criteria comprises:
      determining the subset of the plurality of methods in the source code based on each method in the subset being a public method to which the designated attribute is applied; and
   wherein the result identifies each method in the subset.

12. The method of claim 10, wherein the source code includes a plurality of method calls;
   wherein the semantic code query is a semantic search query that requests a subset of the plurality of method calls in the source code such that each method call in the subset is within executable code of a specified type and is configured to call to a method having a specified name;
   wherein determining the portion of the source code that satisfies the search criteria comprises:
      determining the subset of the plurality of method calls in the source code based on each method call in the subset being within executable code of the specified type and being configured to call to a method having the specified name; and
   wherein the result identifies each method call in the subset.

13. The method of claim 10, wherein the source code includes a plurality of methods;
   wherein the semantic code query is a semantic search query that requests a subset of the plurality of methods in the source code such that each method in the subset is a public method that is configured to return a specified type of data structure;
   wherein determining the portion of the source code that satisfies the search criteria comprises:
      determining the subset of the plurality of methods in the source code based on each method in the subset being a public method that is configured to return the specified type of data structure; and
   wherein the result identifies each method in the subset.

14. The method of claim 10, wherein the source code includes a plurality of fields;
   wherein the semantic code query is a code analysis query that requests a subset of the plurality of fields in the source code such that each field in the subset is a non-static field having an attribute that is defined to be applicable to only static fields;
   wherein determining the portion of the source code that satisfies the search criteria comprises:
      determining the subset of the plurality of fields in the source code based on each field in the subset being a non-static field having an attribute that is defined to be applicable to only static fields; and
   wherein the result identifies each field in the subset.

15. The method of claim 10, wherein the source code includes a plurality of attributes associated with a plurality of fields;
   wherein the semantic code query is a code modification query that requests deletion of each instance of an attribute of the plurality of attributes that is defined not to be applicable to a static field and that is applied to a static field;
   wherein determining the portion of the source code that satisfies the search criteria comprises:
      determining each instance of an attribute of the plurality of attributes that is defined not to be applicable to a static field and that is applied to a static field; and
   wherein the method further comprises:
      deleting each instance of an attribute of the plurality of attributes that is defined not to be applicable to a static field and that is applied to a static field.

16. The method of claim 10, wherein the source code includes a plurality of methods;
   wherein the semantic code query is a semantic search query that requests a subset of the plurality of methods in the source code such that each method in the subset includes a number of lines of code that is greater than or equal to a threshold number;
   wherein determining the portion of the source code that satisfies the search criteria comprises:
      determining the subset of the plurality of methods in the source code based on each method in the subset including a number of lines of code that is greater than or equal to the threshold number; and
   wherein the result identifies each method in the subset.

17. The method of claim 10, wherein the source code includes a plurality of types;
   wherein the semantic code query is a semantic search query that requests a subset of the plurality of types in the source code such that each type in the subset is included in a first namespace of the source code and references a type in a second namespace of the source code;
   wherein determining the portion of the source code that satisfies the search criteria comprises:
      determining the subset of the plurality of types in the source code based on each type in the subset being included in the first namespace of the source code and referencing a type in the second namespace of the source code; and
   wherein the result identifies each type in the subset.

18. The method of claim 10, wherein the source code includes a plurality of types;
   wherein the semantic code query is a semantic search query that requests a subset of the plurality of types in the source code such that each type in the subset is a nested type that is defined in another type of the plurality of types;
   wherein determining the portion of the source code that satisfies the search criteria comprises:
      determining the subset of the plurality of types in the source code based on each type in the subset being a nested type that is defined in another type of the plurality of types; and
   wherein the result identifies each type in the subset.

19. The method of claim 10, wherein the source code includes a plurality of TODO comments that indicate dates;
   wherein the semantic code query is a semantic search query that requests a subset of the plurality of TODO comments in the source code such that each TODO comment in the subset indicates a data that precedes a reference date;

wherein determining the portion of the source code that satisfies the search criteria comprises:

determining the subset of the plurality of TODO comments in the source code based on each TODO comment in the subset indicating a data that precedes the reference date; and wherein the result identifies each TODO comment in the subset.

20. The method of claim 10, wherein the source code includes a plurality of methods;

wherein the semantic code query is a code analysis query that requests a subset of the plurality of methods in the source code such that each method in the subset is an asynchronous method that does not include a parameter that enables the respective asynchronous method to be cancelled;

wherein determining the portion of the source code that satisfies the search criteria comprises:

determining the subset of the plurality of methods in the source code based on each method in the subset being an asynchronous method that does not include a parameter that enables the respective asynchronous method to be cancelled; and wherein the result identifies each method in the subset.

21. The method of claim 10, wherein the source code includes a plurality of code patterns;

wherein the semantic code query is a code analysis query that requests a subset of the plurality of code patterns in the source code such that each code pattern in the subset includes a lock statement that is configured to call a public method;

wherein determining the portion of the source code that satisfies the search criteria comprises:

determining the subset of the plurality of code patterns in the source code based on each code pattern in the subset including a lock statement that is configured to call a public method; and wherein the result identifies each code pattern in the subset.

22. The method of claim 10, wherein the source code includes a plurality of variables;

wherein the semantic code query is a code modification query that requests that each local variable of the plurality of variables having a name that starts with an uppercase letter be renamed such that the respective name starts with a lowercase letter;

wherein determining the portion of the source code that satisfies the search criteria comprises:

determining each local variable of the plurality of variables having a name that starts with an uppercase letter; and wherein the method further comprises:

renaming each local variable of the plurality of variables having a name that starts with an uppercase letter such that the respective name starts with a lowercase letter.

23. A computer program product comprising a computer-readable storage medium having instructions recorded thereon for enabling a processor-based system to use a semantic tree of a compiler to execute a semantic code query against source code by performing operations, the operations comprising:

generating an object model that represents the source code, the object model including the semantic tree, the semantic tree representing a meaning of strings in the source code based at least in part on a grammar, which is defined at least in part by an application programming interface (API) that is exposed by the compiler and the object model;

receiving the semantic code query, which is written in a code query language associated with the compiler, as an input to the compiler, the semantic code query including search criteria;

determining a portion of the source code that satisfies the search criteria by executing the semantic code query against the semantic tree using the API that is exposed by the compiler; and providing a result of the semantic code query, the result identifying the portion of the source code that satisfies the search criteria.

* * * * *